United States Patent
Jha (10) Patent No.: US 10,248,416 B2
(45) Date of Patent: Apr. 2, 2019

(54) ENHANCING CODE REVIEW THROUGHPUT BASED ON SEPARATE REVIEWER AND AUTHOR PROFILES

(71) Applicant: International Business Machines Corporation, Armonk, NY (US)

(72) Inventor: Prem Shanker Jha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/476,266

(22) Filed: Mar. 31, 2017

(65) Prior Publication Data

US 2018/0285103 A1 Oct. 4, 2018

(51) Int. Cl.
*G06F 8/77* (2018.01)
*G06F 8/10* (2018.01)

(52) U.S. Cl.
CPC . *G06F 8/77* (2013.01); *G06F 8/10* (2013.01)

(58) Field of Classification Search
None
See application file for complete search history.

(56) References Cited

U.S. PATENT DOCUMENTS

| | | | | |
|---|---|---|---|---|
| 7,562,344 B1* | 7/2009 | Allen | | G06F 8/33 717/100 |
| 7,904,802 B1* | 3/2011 | Kolawa | | G06Q 10/103 705/300 |
| 9,201,646 B2* | 12/2015 | Balachandran | | G06F 8/71 |
| 9,245,256 B2* | 1/2016 | Saraya | | G06Q 10/103 |
| 2003/0192029 A1* | 10/2003 | Hughes | | G06F 8/20 717/101 |
| 2008/0295085 A1* | 11/2008 | Rachamadugu | | G06F 8/75 717/159 |
| 2012/0216172 A1* | 8/2012 | Armstrong | | G06F 8/30 717/101 |

(Continued)

OTHER PUBLICATIONS

Yu, "Reviewer Recommender of Pull-Requests In GitHub", 2014 IEEE International Conference on Software Maintenance and Evolution, 2014.*

(Continued)

*Primary Examiner* — Hossain M Morshed
(74) *Attorney, Agent, or Firm* — Patterson + Sheridan, LLP (57) ABSTRACT

Embodiments include systems, methods, and computer program products to perform an operation for enhancing code review throughput based on separate developer and reviewer profiles. The operation generally includes receiving source code from a first user, determining a set of coding attributes associated with the first user from the first user's developer profile, and determining, for each of one or more second users, coding review attributes associated with the second user from the second user's reviewer profile. The operation further includes evaluating the coding review attributes based on a proficiency score assigned to each coding review attribute. The proficiency score for each coding review attribute indicates a proficiency of the second user in reviewing a coding attribute from the set of coding attributes. The operation further includes selecting at least one of the second users to review the first user's source code based in part on the evaluation.

17 Claims, 9 Drawing Sheets

(56) References Cited

U.S. PATENT DOCUMENTS

| | | | |
|---|---|---|---|
| 2013/0007704 A1* | 1/2013 | Haynes | G06Q 10/00 |
| | | | 717/120 |
| 2014/0196010 A1* | 7/2014 | Balachandran | G06F 8/71 |
| | | | 717/124 |
| 2017/0109179 A1* | 4/2017 | Hughes | G06F 3/04842 |
| 2017/0123790 A1* | 5/2017 | Gupta | G06F 11/3604 |
| 2018/0285103 A1* | 10/2018 | Jha | G06F 8/10 |

OTHER PUBLICATIONS

Kagdi, "Who Can Help Me with this Change Request?", Program Comprehension, 2009. ICPC '09. IEEE 17th International Conference on, May 2009, pp. 273-277.*

Yue Yu et al. "Reviewer Recommender of Pull-Requests in Github," IEEE International Conference on Software Maintenance and Evolution, pp. 609-612, 2014.

\* cited by examiner

FIGURE 1

```
10  int main ( ) //convert integer n in decimal to binary
11  {
12    int n, c, k;
13
14    for (c = 31; c >=0; c++)     202
15    {
16      k = n >> c;
17      if (k & 1)
18        printf("1");
19      else
20        printf("0");
21    }
22    printf("\n");
23    ...
24
25
26  }
27
```

200

Reviewer 1

Should be "c--" instead of "c++" at line 14

...
...

206

Reply    Done    Fix

Reviewer Profile 300

| Priority | Profile Attribute | Profile Attribute Value |
|---|---|---|
| 1 | Turnaround time | |
| 2 | Proficiency in capturing algorithmic errors | |
| 3 | Proficiency in capturing missing use cases | |
| 4 | Proficiency in capturing programming language based errors | |
| 5 | Proficiency in domain | |
| 6 | Proficiency in capturing errors in communication protocol and component interaction | |
| 7 | Proficiency in coding convention | |
| 8 | Number of findings accepted by author for rework | |
| ... | | |

ENHANCING CODE REVIEW THROUGHPUT BASED ON SEPARATE REVIEWER AND AUTHOR PROFILES

BACKGROUND

The present disclosure generally relates to the software development, and more specifically to techniques enhancing code review throughput based on separate reviewer and developer profiles.

Code review is an effective mechanism that can be used to verify the end deliverable of a software development process. Coding and design errors, for example, can be introduced during the course of the software development cycle and affect the quality of the end deliverable. During code review, peer developers generally review computer source code for errors, mistakes, and/or vulnerabilities that may be present in the source code. Such code and design errors can include common vulnerabilities, such as format string exploits, memory leaks, logical errors, etc. Uncovering code and design errors before a deliverable gets integrated to production code base can reduce the overall cost and duration of the software development cycle.

For a formal peer review of software, reviewers are generally selected based on proficiency in software language, proficiency in product design, proficiency in domain, past experience, consumption of the end deliverable, etc. Based on technical knowledge, domain knowledge and experience, a given reviewer may view code from a perspective that is different from other reviewers. For example, some reviewers may focus more on business logic and use cases, whereas other reviewers may focus on the efficiency of algorithms in the code. In another example, some reviewers may focus more on nuances of language used for coding, whereas other reviewers may focus on interaction between components. In general, for the same work item, different reviewers often identify different types of errors and/or vulnerabilities.

Typically, for domains (e.g., consumer or mobile) where release cycles are short, effort should be made to improve code review yield per reviewer (e.g., minimize the review cycle length) without impacting quality of the end deliverable. However, due to the inherent nature of a reviewer, certain types of errors may get more focus compared to other types of errors. The errors that a given reviewer tends to focus on may not be errors which the author is more prone to make. In such cases, although a completed review of source code may finish with minor comments and cosmetic changes, there may be serious errors within the source code that are undetected.

SUMMARY

One embodiment presented herein includes a method. The method generally includes receiving source code associated with a first user, and determining a set of coding attributes associated with the first user from a first type of profile for the first user. The method also includes determining, for each of one or more second users, one or more coding review attributes associated with the second user from a second type of profile for the second user. The method further includes evaluating the one or more coding review attributes based on a proficiency score assigned to each coding review attribute. The proficiency score for each coding review attribute indicates a proficiency of the second user in reviewing a coding attribute from the set of coding attributes. The method further includes selecting at least one of the second users to review the first user's source code based at least in part on the evaluation, and sending the source code to the selected at least one second user to review.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments presented herein provide techniques for selecting one or more peer users (e.g., peer developers) to review source code based on separate reviewer and developer profiles. For example, in one embodiment, a code review component on a computing system receives source code submitted by a user (e.g., developer) for review. Once received, the code review component can identify and obtain a developer (or author) profile for the user. The user's developer profile indicates a likelihood of the user to make different types of errors and mistakes when writing code. Examples of such errors can include, but are not limited to, coding errors, algorithmic errors, design errors, interface errors, etc.

In addition, the code review component can identify and obtain reviewer profiles for peer users (e.g., peer developers) that are available to review the user's source code. Each reviewer profile may include one or more coding review attributes associated with the peer user's ability to identify certain types of errors, mistakes and vulnerabilities when reviewing source code. For example, a peer user's reviewer profile may indicate the peer user's proficiency in identifying coding errors, design errors, system vulnerabilities, etc.

The code review component may select one or more of the available peer users to review the user's source code based in part on the user's developer profile and the peer users' reviewer profiles. In one embodiment, for example, the code review component may select the peer user (or set of peer users) whose reviewer profile indicates has the highest proficiency in identifying the types of errors the user has a high likelihood of making in source code. The code review component can use one or more different metrics to determine a peer user's proficiency in reviewing source code. For example, such metrics can include the number of complex errors identified per x lines of code, code review throughput, language proficiency, etc. Once the set of peer users are selected, the code review component submits the source code to the selected set of peer users for review. In this manner, the code review component can increase the efficiency and quality of the code review stage in the software development process.

Note embodiments described herein refer to a web-based code review collaboration tool (e.g., Gerrit) as a reference example of a software application that can be used to select peer users to conduct a review of source code based on separate developer and reviewer profiles. Of course one of ordinary skill in the art will readily recognize that other types of code review collaboration tools can be adapted to use the techniques presented herein to select peers users for code review.

Figure 1:
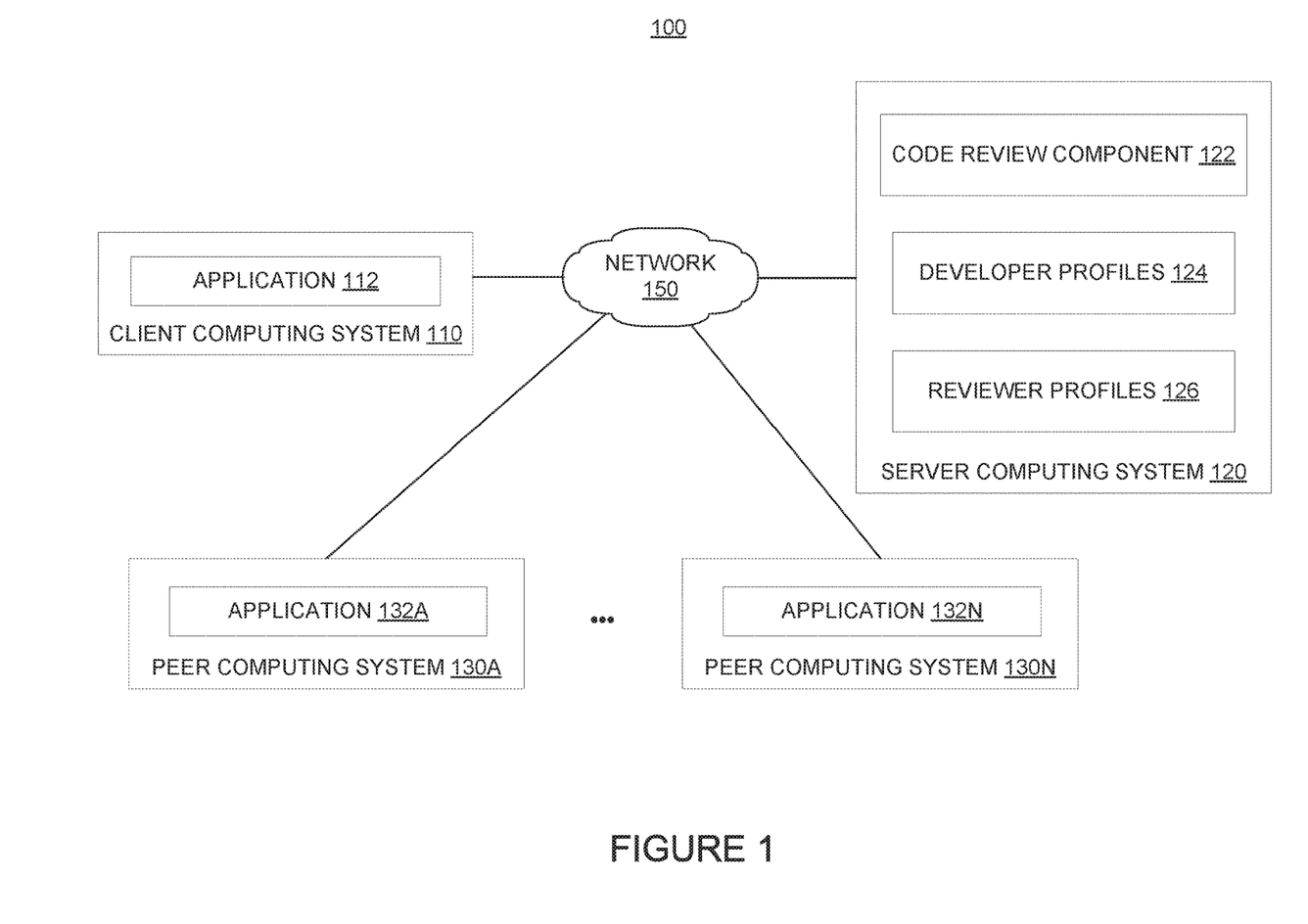
FIG. 1 illustrates an example computing environment configured to select users to review source code based on separate reviewer and developer profiles, according to one embodiment.

FIG. 1 illustrates an example computing environment 100 configured to select peer users to review source code based on separate reviewer and developer profiles, according to one embodiment. As shown, the computing environment 100 includes a client computing system 110, peer computing systems 130A-N, and server computing system 120 connected via network 150. In general, the network 150 may be a wide area network (WAN), local area network (LAN), wireless LAN (WLAN), etc. In one embodiment, the network 150 is the Internet. Each of the computing systems 110, 120 and 130A-N can be any kind of physical computing system having a network interface, such as a desktop computer, laptop computer, mobile device, tablet computer, server computing system, and the like.

Computing system 110 includes an application 112, and computing systems 130A-N include applications 132A-132N, respectively. Applications 112, 132A-N are included to be representative of code editing software that allows users to write, edit, and compile source code. Through applications 112, 132, users can write source code and send the source code to the code review component 122 on computing system 120 for review. For example, applications 112, 132 may provide a text editor, command line editor, or code editor (e.g., an integrated development environment (IDE)). Additionally, in some cases, applications 112, 132 may be a browser or standalone client used to access services provided by the code review component 122. For example, users may collaborate with other peer users to review and edit code submitted to the code review component 122.

In one embodiment, a user may develop source code via application 112 and submit the source code to the code review component 122 for review by one or more peer developers. Once received, the code review component 122 may select one or more peer users on peer computing systems 130A-N to review the source code based on a developer profile 124 for the user and a reviewer profile 126 for each of the peer users. For example, the code review component 122 may maintain a separate developer profile 124 and reviewer profile 126 for each user that interacts with the code review component 122. A user's developer profile can indicate a likelihood of the user to make different types of errors or mistakes when writing code. For example, a developer profile for user A may indicate that user A is more likely to make coding errors, e.g., such as missing conditions, incorrect variable types, incorrect assignments, etc., as opposed to design errors when writing code. Similarly, a developer profile for user B may indicate that user B is more likely to use incorrect coding conventions (e.g., such as headers for file, class, or functions) and make algorithmic errors when writing code.

The code review component 122 may create a developer profile for a user based reviews (e.g., by peer developers) of the user's source code over a period of time. For example, a developer profile for user A may be based on reviews of all the source code submitted by user A over the course of a week, or some other time period. In one embodiment, the code review component 122 may maintain users' developer profiles in a database and use the developer profiles to assist peer developers review of source code submitted to the code review component 122.

In one reference example, once the code review component 122 receives new source code from user A, the code review component 122 can retrieve user A's developer profile, and identify the set of mistakes user A often makes when writing code based on user A's developer profile. The code review component can then assist reviewers in their review of user A's source code, for example, by highlighting portions of the code associated with the identified types of mistakes, notifying the reviewers as to the types of mistakes, the last time user A made each type of mistake, etc. In this manner, the code review component 122 can increase the efficiency of code review by allowing reviewers to focus more attention on the particular areas of source code that are associated with the kind of errors the user has a likelihood of making, compared to other areas of the source code that may not be associated with the kind of errors the user has a likelihood of making.

Figure 2A:
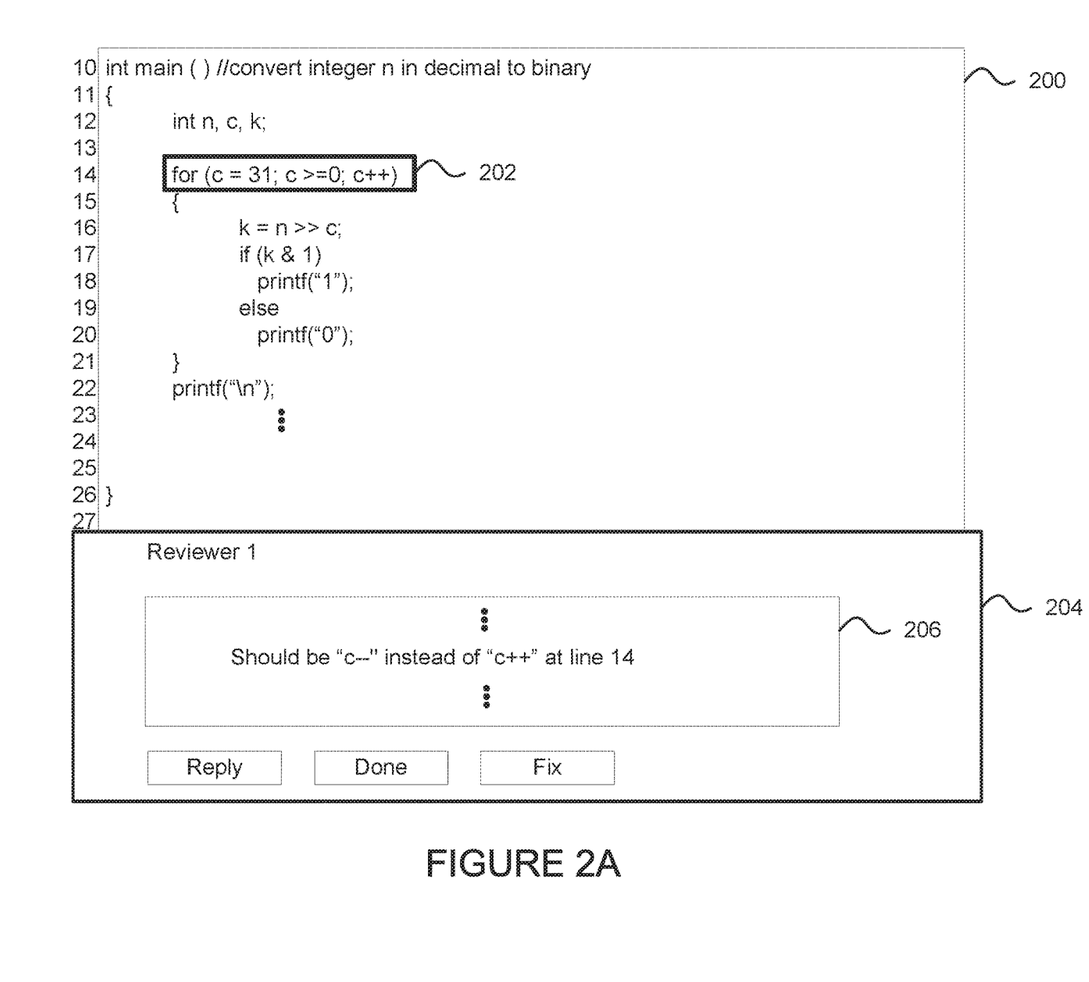
FIGS. 2A-2B illustrates examples of a code review component on a computing system assisting a user in reviewing source code, according to one embodiment.
Figure 2B:
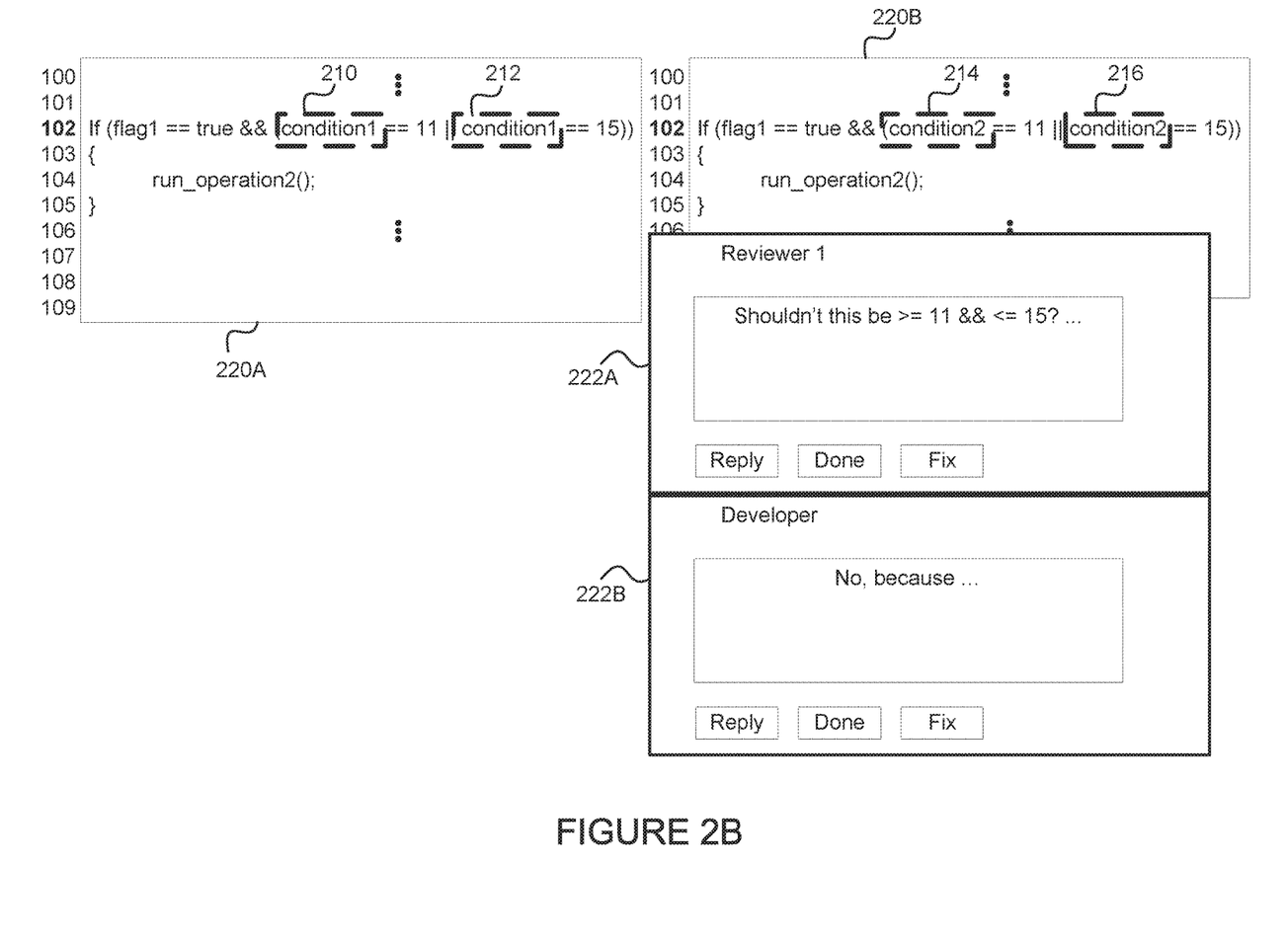

FIGS. 2A-2B illustrate reference examples of how the code review component 122 can assist a peer developer in reviewing source code. In particular, FIGS. 2A-2B depict views from the perspective of a peer user interacting with the code review component 122 via application 132 (e.g., to review code submitted to the code review component 122). As shown in FIG. 2A, the code review component 122 can highlight relevant sections (e.g., such as section 202) of code in panel 200 for reviewer 1. In some embodiments, the code review component 122 can indicate sections of code in the panel 200 for review in different shades (or colors) based on severity, frequency of mistake, etc. The code review component 122 can identify section 202 as a high risk area of code for errors based on the user's developer profile. For example, such profile can indicate that the user has a likelihood (e.g., greater than a predefined threshold) of making conditional errors when writing code. Reviewer 1, in turn, may provide comments and/or other suggestions in a comment section 206 in panel 204 regarding section 202 and/or other sections of code in panel 200.

In some embodiments, the code review component 122 can allow users to collaborate when reviewing source code. For example, as shown in FIG. 2B, panel 220A includes existing code submitted by a user (e.g., developer), and panel 220B includes code that has been modified by a peer user (e.g., reviewer 1). The code review component 122 allows developers and reviewers to collaborate on different sections of code (e.g., sections 210-212). In this example, reviewer 1 can provide comments and/or suggestions for modifying line 102. The developer, in turn, can accept the reviewer's comments, explain why a modification is not appropriate, suggest a different type of modification, etc.

Referring again to FIG. 1, in some embodiments, the code review component 122 may also maintain a reviewer profile 126 for each user. The reviewer profile 126 may indicate the user's proficiency in identifying different types of errors when reviewing source code, the user's code review throughput (or turnaround time), etc. A user's reviewer profile 126 (e.g., for user A) may be separate (or independent) from the user's developer profile 124. Put differently, the different types of errors that a given user has a likelihood of making when writing code may not depend on that user's ability to catch different types of errors when reviewing source code, and vice versa.

In one embodiment, the code review component 122 can generate a user's reviewer profile based on outcomes of reviews of source code completed by developers. For example, during a review of source code, each reviewer interacting with the code review component 122 can classify their findings in terms of error type. Table I shows examples of different types of errors that a reviewer may classify in a review of source code.

TABLE I

Example Error Types

| Number | Error Type | Error Sub type (if any) |
|---|---|---|
| 1 | Algorithmic Error | |
| 2 | Missing Requirement/Use Case | |
| 3 | Coding Error | Missing or bad check |
| | | Bad assignment |
| | | Bad increment/decrement |
| | | Missing condition |
| | | Variable scope |
| | | Language nuances |
| | | Bad variable type |
| 4 | Coding conventions | Variable naming convention |
| | | Headers for file, class or functions |
| 5 | Interface error | |
| 6 | Suggestion | |
| 7 | Protocol error | |
| 8 | Calculation error | |
| 9 | Design error | |
| 10 | Requirement error | |

Each reviewer may review each line of code and, if an error is identified, classify the type of error in terms of severity. For example, a reviewer can mark an identified error as a high severity error, medium severity error, low severity error, cosmetic error, etc. Once each reviewer has completed their review, the code review component 122 can classify each reviewer's findings in terms of rarity. For example, if only one reviewer out of a set of reviewers has been able to identify a medium or high severity error, and the identified error has been accepted for rework (i.e., the author has agreed that it is an error), the code review component 122 can mark the reviewer's finding as a rare finding. On the other hand, if a reviewer has identified an error that multiple other reviewers have also been able to identify, the code review component 122 may classify the reviewer's finding as an ordinary finding.

In one embodiment, the code review component 122 can use the number of rare findings per x lines of code as a metric for identifying a reviewer's proficiency in reviewing code. For example, if user A is able to identify a higher number of rare severe findings compared to user B, the code review component 122 may determine user A is more proficient in reviewing code. The code review component 122 may indicate a measure of such proficiency in user A's reviewer profile. For example, the code review component 122 can increase an attribute value for proficiency in reporting rare findings in user A's reviewer profile.

In one embodiment, the code review component 122 can use review throughput as a metric for identifying a reviewer's proficiency in reviewing code. For example, assume there is a large amount of existing code that has been submitted for refactoring. In such cases, the reviewer that is able to progress through the code in the shortest amount of time while identifying a threshold number of (errors) findings in the code may have a higher proficiency (e.g., proficiency score) in review throughput compared to another reviewer. The code review component 122 can increase attribute values (or score) for proficiency in turnaround time for user's that are able to identify a threshold number of errors in a predefined amount of time.

In one embodiment, the code review component 122 can use the number of language based coding errors per lines of code as a metric for identifying a reviewer's proficiency in reviewing code. For example, users that are able to identify errors related to nuances of the coding language (e.g., such as data type, class, etc.) may be more proficient in reviewing code for maintainability, reliability, etc. In general, however, the code review component 122 can use other metrics, or combination of metrics to determine a user's ability to review code. Examples of such metrics can include, for example, number of missing use cases identified per x number lines of code, number of algorithmic errors identified per x number lines of code, etc.

Figure 3:
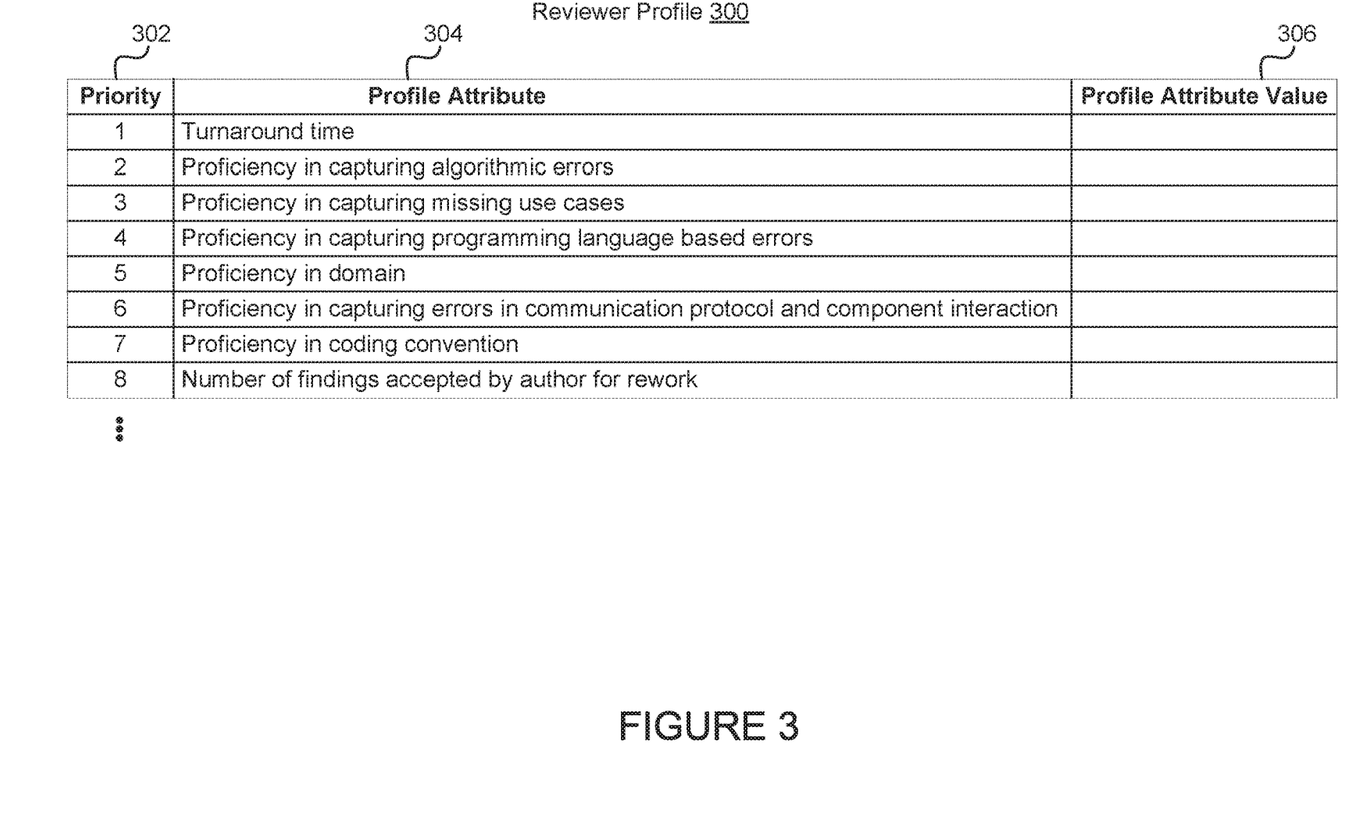
FIG. 3 illustrates an example reviewer profile for a user, according to one embodiment.

In one embodiment, the code review component 122 can determine, for each user, one or more profile attributes associated with the user's ability to review code based on one or more of the above metrics. The code review component 122 can then generate a reviewer profile that indicates a value (or proficiency score) for each of the one or more profile attributes. FIG. 3 illustrates one reference example of a reviewer profile 300 for a user, according to one embodiment.

As shown in FIG. 3, the reviewer profile may include a list of profile attributes 304, examples of which include, but are not limited to, turnaround time, proficiency in capturing algorithmic errors, proficiency in capturing missing use cases, proficiency in capturing programming language based errors, proficiency in domain (e.g., mobile), proficiency in capturing communication protocol and/or component interaction errors, proficiency in coding convention, number of findings accepted by author for rework, etc. The reviewer profile 300 also includes a profile attribute value 306 for each profile attribute 304. The code review component 122 can assign and/or adjust profile attribute values (or proficiency scores) 306 for the profile attributes 304 based on the outcomes of the reviews by each user. For example, as a user completes additional reviews, the code review component 122 can increase or decrease the value associated with the profile attribute for number of findings accepted by author for rework, based on the metric for number of rare errors identified by the user, e.g., in each review. Similarly, the code review component 122 can update attribute values for other attributes using the above metrics as the user completes each review. In addition, in some embodiments, each profile attribute 304 can be assigned a priority value 302 in the reviewer profile. In some cases, the priority for each profile attribute may be set based on profile attribute values 306. In some cases, the order of priority may be designated by the code review component 302.

In one embodiment, the code review component 122 may store developer profiles 124 and reviewer profiles 126 for each user. Once the code review component 122 receives new code from a user (e.g., user A), the code review component 122 can retrieve the developer profile for user A, and the reviewer profiles for the available peer users (e.g., peer users B, C, D). The code review component 122 can evaluate user A's developer profile to determine the types of errors user A is prone to making when writing code. For example, based on user A's developer profile, the code review component 122 may determine that user A has a habit of making errors in conditional statements.

After identifying the types of errors user A is prone to making, the code review component 122 can evaluate the reviewer profiles for peer users B, C, D to determine which peer user has a high proficiency in catching those types of errors when reviewing code. Continuing with the above example, if user A has a habit of making errors in conditional statements, and peer user B's profile indicates a strong ability to capture algorithmic errors (e.g., the attribute value for user B's proficiency in catching algorithm errors is above a threshold or highest among other peer users), the code review component 122 may select peer user B to review user A's code. In cases where the user (e.g., user A) does not have a developer profile (e.g., user A may have submitted code for the first time), the code review component 122 may select a peer user based on a default set of metrics. For example, in one embodiment, the code review component 122 can select a peer user whose profile indicates has a high average yield and low turn around time.

In some embodiments, the code review component 122 can also consider the review priorities of the author submitting the code for review when selecting the set of peer users to review the user's code. For example, when submitting code to the code review component 122, the user can specify a set of verification requirements, such as verification of algorithm, memory utilization, concurrency, real-time response, efficiency, etc. that should be met by the review. Once received, the code review component 122 can identify the reviewer profile that is likely to meet or exceed the expectations of the user.

Advantageously, by selecting users to conduct a review of source code based on a developer profile for the author of the code and reviewer profiles for peer users, the code review component 122 can increase the efficiency and quality of the code review process.

Figure 4:
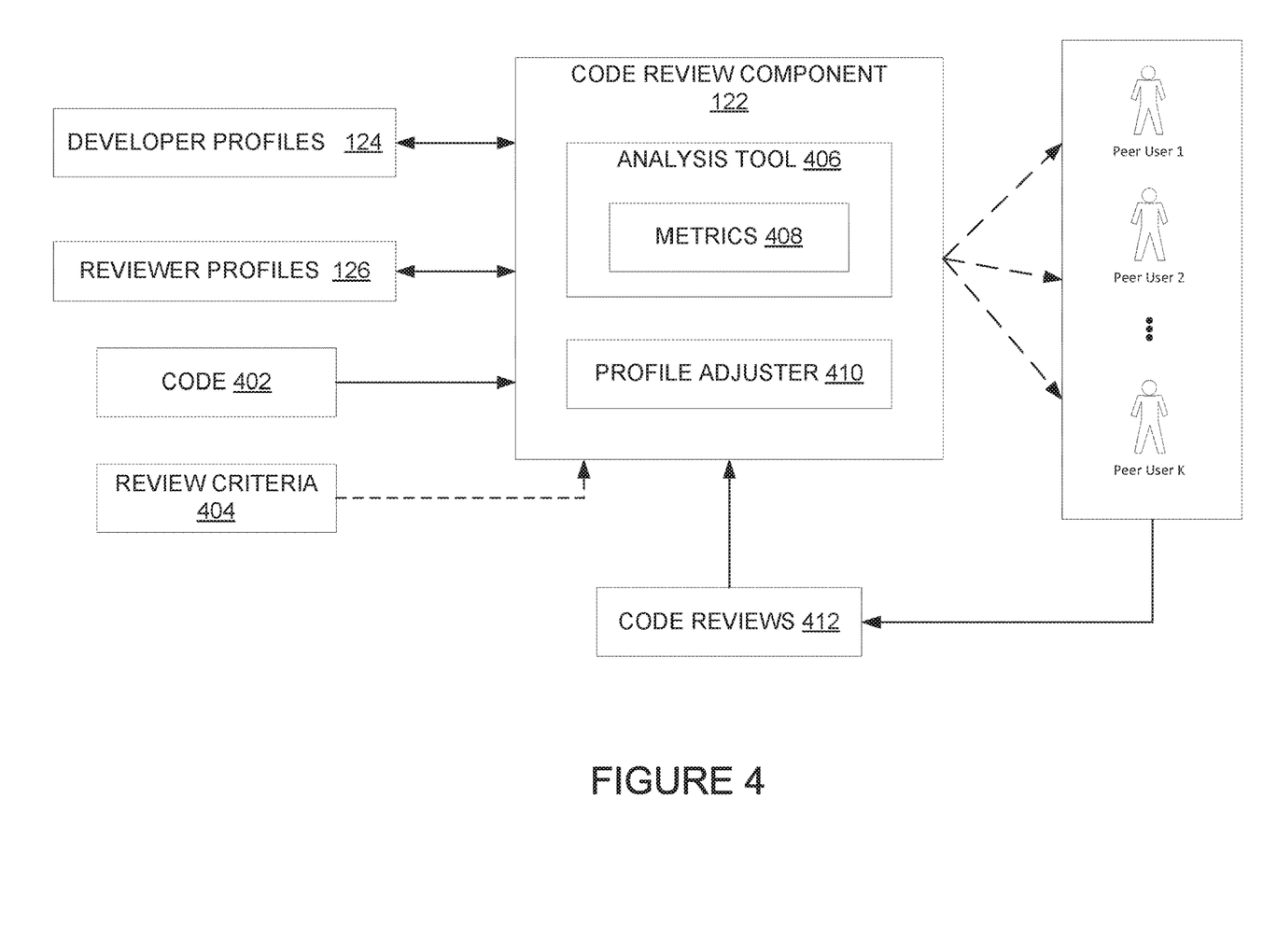
FIG. 4 illustrates components of a code review component configured to select users to review code based on separate developer and reviewer profiles, according to one embodiment.

FIG. 4 further illustrates components of the code review component 122 described relative to FIG. 1, according to one embodiment. As shown in FIG. 4, the code review component 122 includes analysis tool 406 and profile adjuster 410. The code review component 122 receives source code 402 from a user. In addition, the code review component 122 can receive review criteria 404 from the user. As mentioned above, such review criteria can indicate the user's minimum set of verification requirements (e.g., such as verification of algorithms in the code, memory utilization in the code, concurrency, real-time response, etc.) that should be satisfied by the review.

Once received, the code review component 122 retrieves a developer profile 124 for the user. As noted above, the developer profile 124 for the user may have been generated based on a collection of source code previously submitted by the user. The code review component 122 can use analysis tool 406 to evaluate the user's developer profile 124 and determine the types of errors the user has a likelihood of making when writing code. In some embodiments, the analysis tool 406 may determine a predetermined number of different types of errors (e.g., the 5 most common types of errors). In some embodiments, the analysis tool 406 can determine the types of errors that occur greater than a predefined threshold (e.g., the set of errors occurring more than a threshold number of times or percentage of time).

In addition, the code review component 122 can retrieve reviewer profiles 126 for peer users 1-K. The code review component can use analysis tool 406 to select a set of peer users 1-K, whose reviewer profiles 126 indicate have a high proficiency in catching the types of errors the user has a habit of making when writing code. The analysis tool 406 can select the set of peer users based on metrics 408 and/or review criteria 404. In some embodiments, the analysis tool 406 may select the peer user that has the highest proficiency in catching a particular type of error. For example, if the user has a habit of making algorithmic errors, the analysis tool 406 can select the peer user that has the highest attribute value (or score) for proficiency in capturing algorithmic errors. Likewise, in one example, if the user indicates (e.g., in review criteria 404) that verification of algorithms in the code should be conducted, the analysis tool 406 can select the peer user that has the highest attribute value for proficiency in capturing algorithm errors. In general, however, the analysis tool can use criteria and/or metrics discussed herein when selecting the set of peer users to review code.

In some embodiments, the analysis tool 406 can select multiple peer users to review the user's code. In particular, in situations where the analysis tool 406 may not be able to identify a single reviewer profile that matches the user's developer profile, the analysis tool 406 can select multiple peer users to review as a group, such that the group as a whole are able to cover the types of errors the user is likely to introduce in the code. For example, assume user A's developer profile indicates that user A has a strong likelihood of making design errors, coding errors, and language based errors when writing code. Further assume, that the analysis tool 406 is unable to identify a single reviewer profile that indicates a proficiency score (e.g., above a certain threshold) in catching each of these types of errors. In this reference example, the analysis tool 406 can select a first peer user that has the highest proficiency (or proficiency score above a threshold) in catching design errors, a second peer user that has the highest proficiency (or proficiency score above a threshold) in catching coding errors, and a third peer user that has the highest proficiency (or proficiency score above a threshold) in catching language based errors. Doing so in this manner allows the code review component 122 to ensure that the user's work item is reviewed by the set of peer users who have the best proficiency in catching the most common errors which the user is most likely to make.

In some embodiments, the code review component 122 can use profile adjuster 410 to update the developer profiles 124 and reviewer profiles 126 based on the code reviews 412 completed by the peer users. For example, the code review component 122 can update each reviewer's profile based on the quality (e.g., accuracy) and quantity of findings reported by each peer user. Assuming peer user 1, for example, accurately reports a large number of errors (e.g., algorithmic errors) per x number lines of code, the code review component 122 can update the reviewer profile for peer user 1 to indicate peer user's proficiency in catching algorithmic errors. Continuing with this example, the code review component 122 can also update the developer profile for the user that submitted the code with the large number of algorithmic errors to reflect that user's likelihood of making those types of errors.

Figure 5:
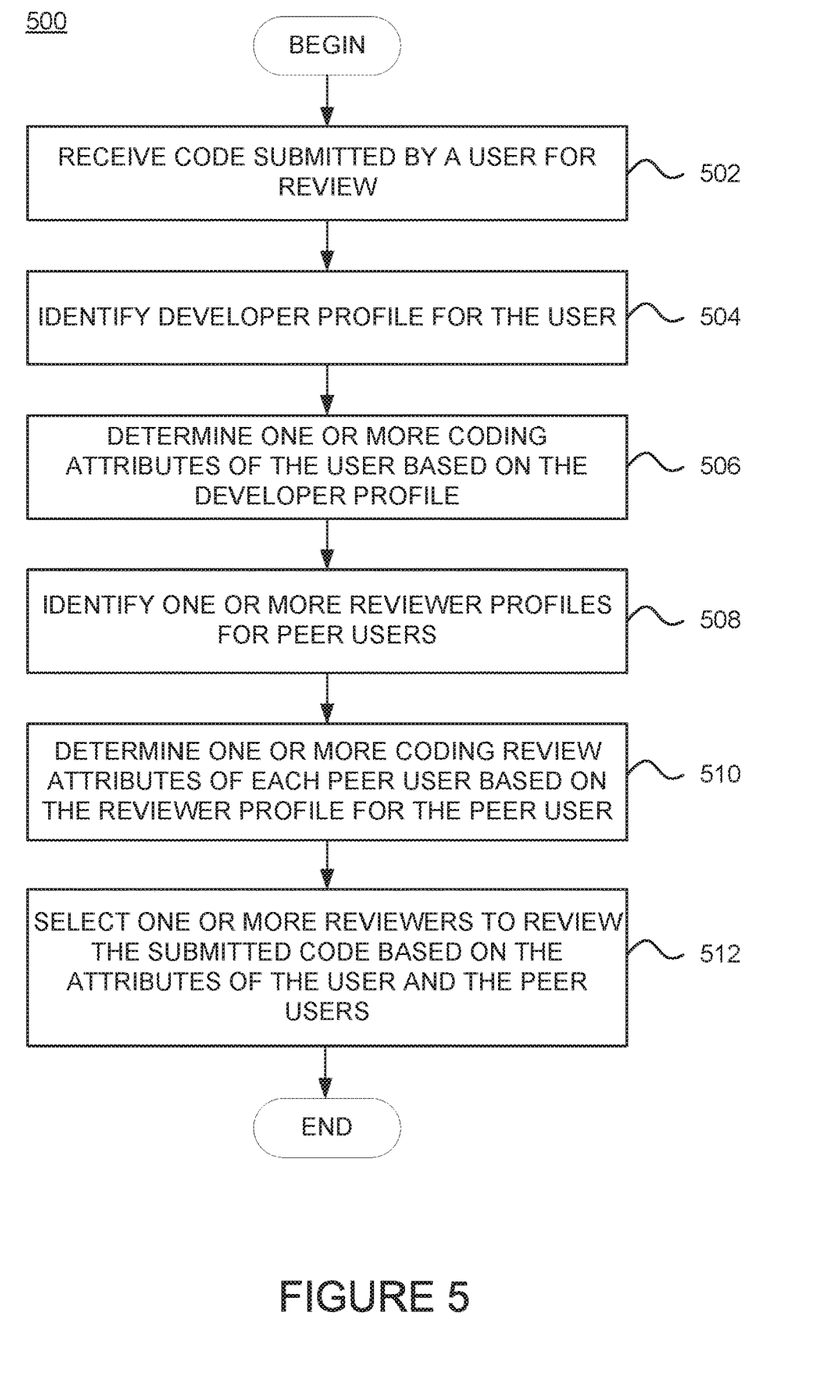
FIG. 5 is a flow chart illustrating a method for selecting users to review code based on separate developer and reviewer profiles, according to one embodiment.

FIG. 5 is a flow chart illustrating a method 500 for selecting users to review code based on separate developer and reviewer profiles, according to one embodiment. As shown, the method 500 begins at block 502, where the code review component 122 receives code submitted by a user for review. At 504, the code review component 122 identifies a developer profile for the user. At 506, the code review component 122 determines one or more coding attributes of the user based on the developer profile. For example, as noted, the coding attributes may indicate a likelihood of the user to introduce different types of errors when writing code.

At 508, the code review component 122 identifies one or more reviewer profiles. The reviewer profiles may be associated with one or more peer users that are available to review the user's code. At 510, the code review component 122 determines, for each peer user, one or more coding review attributes of the peer user based on the reviewer profile for the peer user. At 512, the code review component 122 selects one or more of the peer users to review the submitted code based at least in part on the attributes of the user and the coding review attributes of the peer users.

For example, in one embodiment, the code review component 122 may evaluate the coding review attributes of each peer user based on a proficiency score assigned to each coding review attribute. As noted above, the proficiency score for each coding attribute can indicate a proficiency of the peer user in reviewing one of the attributes of the user that submits the source code review. In one embodiment, the code review component 122 may select one or more of the peer users based in part on the evaluation. For example, the code review component 122 can select the peer user that has the highest proficiency score for catching severe errors per x number lines of code, highest proficiency score for turn-around time, etc.

Additionally, in some embodiments, the code review component 122 can also select the peer user(s) based on a set of review criteria received from the user. As noted above, such review criteria may include a minimum set of verification requirements which must be met by the process of review. The verification requirements may include, but not be limited to, verification of algorithms, memory utilization, concurrency, efficiency, real time response, etc. Once received, the code review component 122 can identify at least one coding review attribute associated with the received code review criteria. For example, if the user has indicated, as a high priority, a review of algorithms in the source code, the code review component 122 can select "proficiency in capturing algorithmic errors" as a coding review attribute to consider among each peer user. Once identified, the code review component 122 can identify the peer user(s) with a proficiency score that exceeds a threshold for proficiency in capturing algorithmic errors, and select the identified peer user(s) to review the user's source code.

Figure 6:
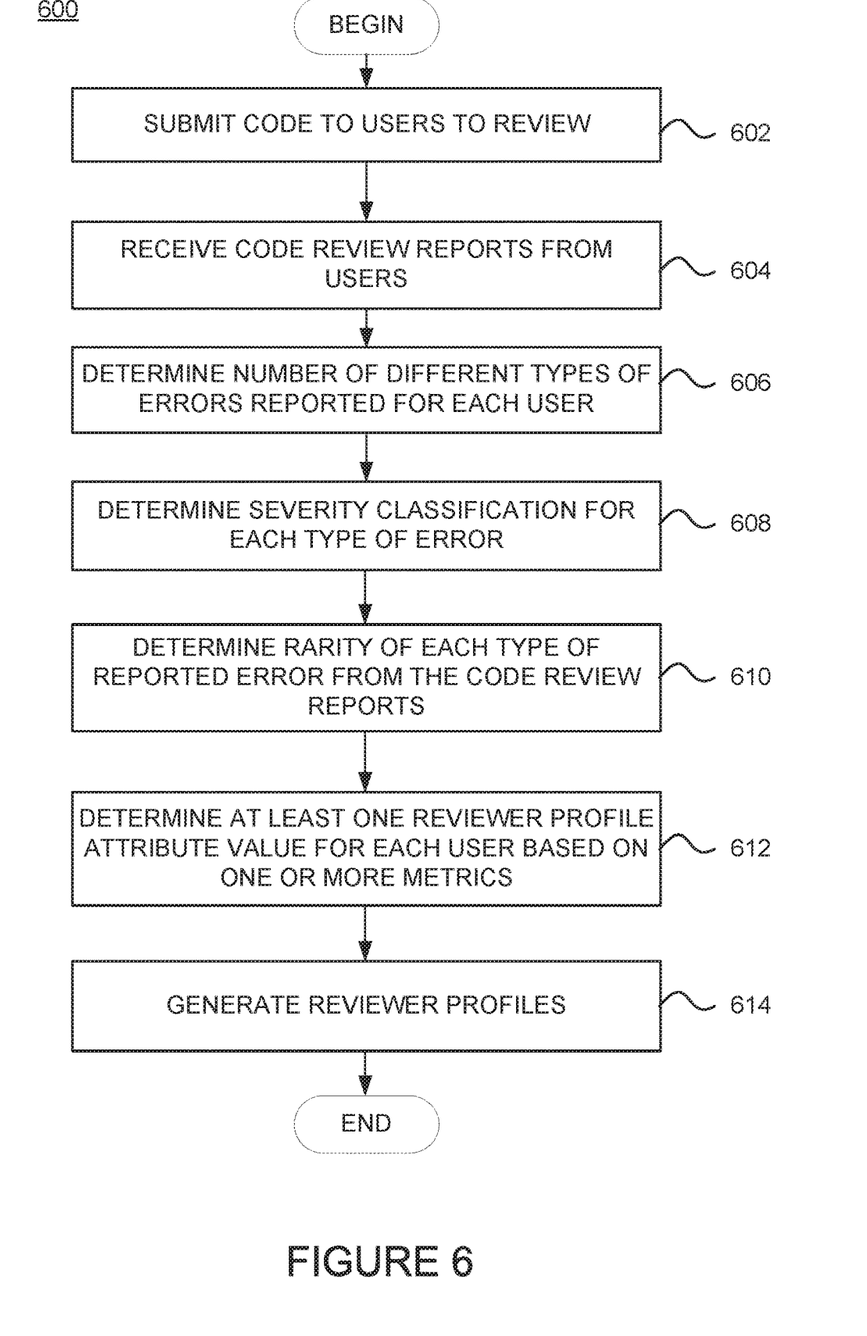
FIG. 6 is a flow chart illustrating a method for generating reviewer profiles for users, according to one embodiment.

FIG. 6 is a flow chart illustrating a method 600 for generating reviewer profiles for users, according to one embodiment. As shown, the method 600 begins at block 602, where the code review component submits code to one or more users for review. Such users, for example, can be peer developers that are available to review code submitted (e.g., by an author) to the code review component 122. In some embodiments, the code review component 122 can prevent a peer user from viewing other peer users' comments and/or code review reports until the peer user complete their own review (e.g., to reduce or avoid bias during the review process). At block 604, the code review component 122 receives code review reports from the users. As noted above, each report may identify one or more different types of errors found by the user, and classify the identified error in terms of severity. The code review component 122, therefore, at block 606, determines the number of different types of errors reported for each user, and at block 608, determines the severity classification for each type of error.

At block 610, the code review component 122 determines the rarity of each type of reported error from the code review reports. As noted above, the code review component 122 can determine the rarity of a reported error in a given user's code review based in part on the number of other users that report the same error. At block 612, the code review component 122 determines at least one reviewer profile attribute value for each user based on one or more metrics. For example, as noted, one metric can include the number of accurate severe errors identified per x number lines of code. At block 614, the code review component 122 generates a reviewer profile for each user. For example, in one embodiment, the code review component 122 can include values for one or more profile attributes.

Figure 7:
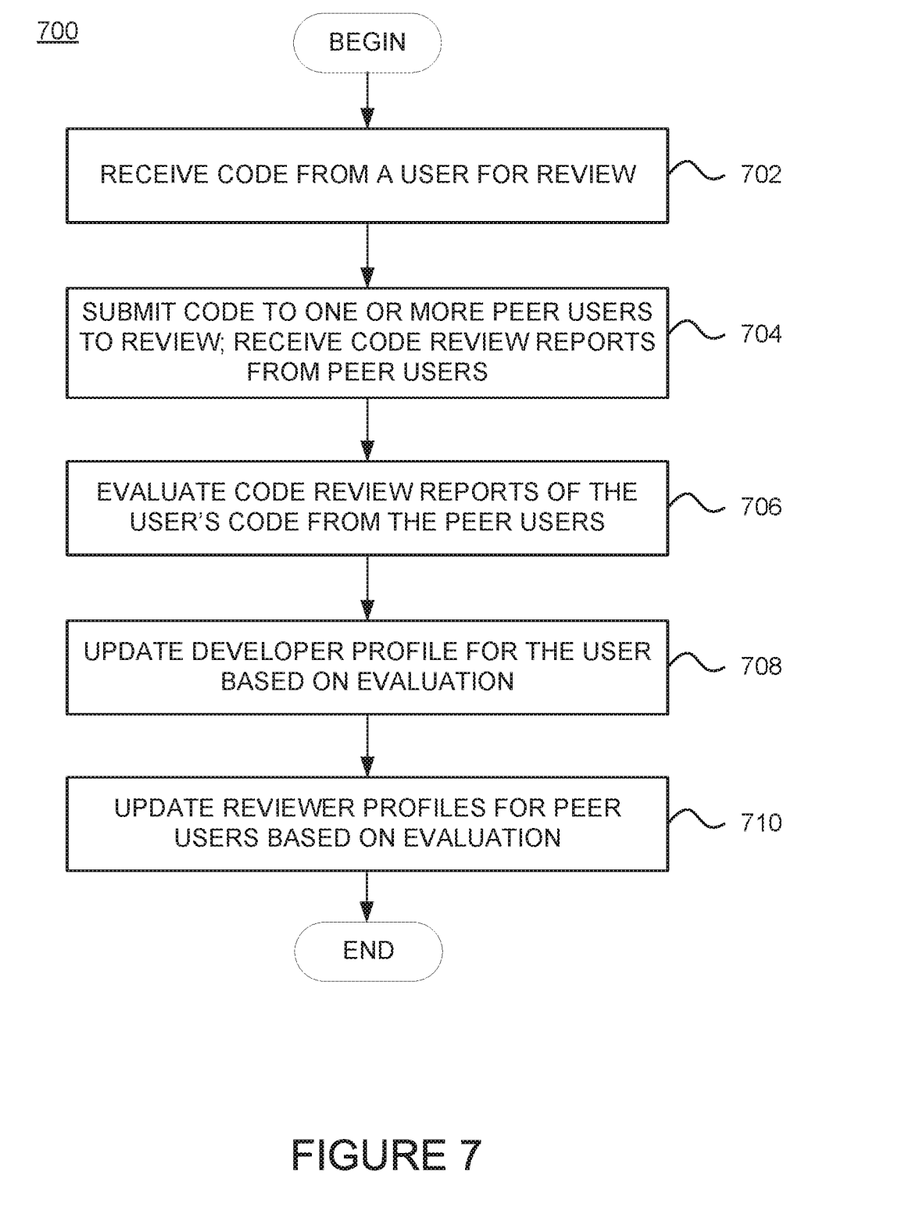
FIG. 7 is a flow chart illustrating a method for updating developer and reviewer profiles, according to one embodiment.

FIG. 7 is a flow chart illustrating a method 700 for updating developer and reviewer profiles, according to one embodiment. As shown, the method 700 begins at block 702, where the code review component 122 receives code from a user for review. At 704, the code review component 122 submits the code to one or more peer users to review, and receives code review reports from the peer users. At 706, the code review component 122 evaluates the code review reports of the user's code from the peer users. For example, the code review component 122 can determine, from the code review reports, the different types of errors the user made, and quality of each peer user's report (e.g., whether some peer users accurately reported errors that other peer users did not identify, the amount of time it took to complete each report, etc.). At 708, the code review component 122 updates the developer profile for the user based on the evaluation. At 710, the code review component 122 updates the reviewer profiles for the peer users based on the evaluation.

Figure 8:
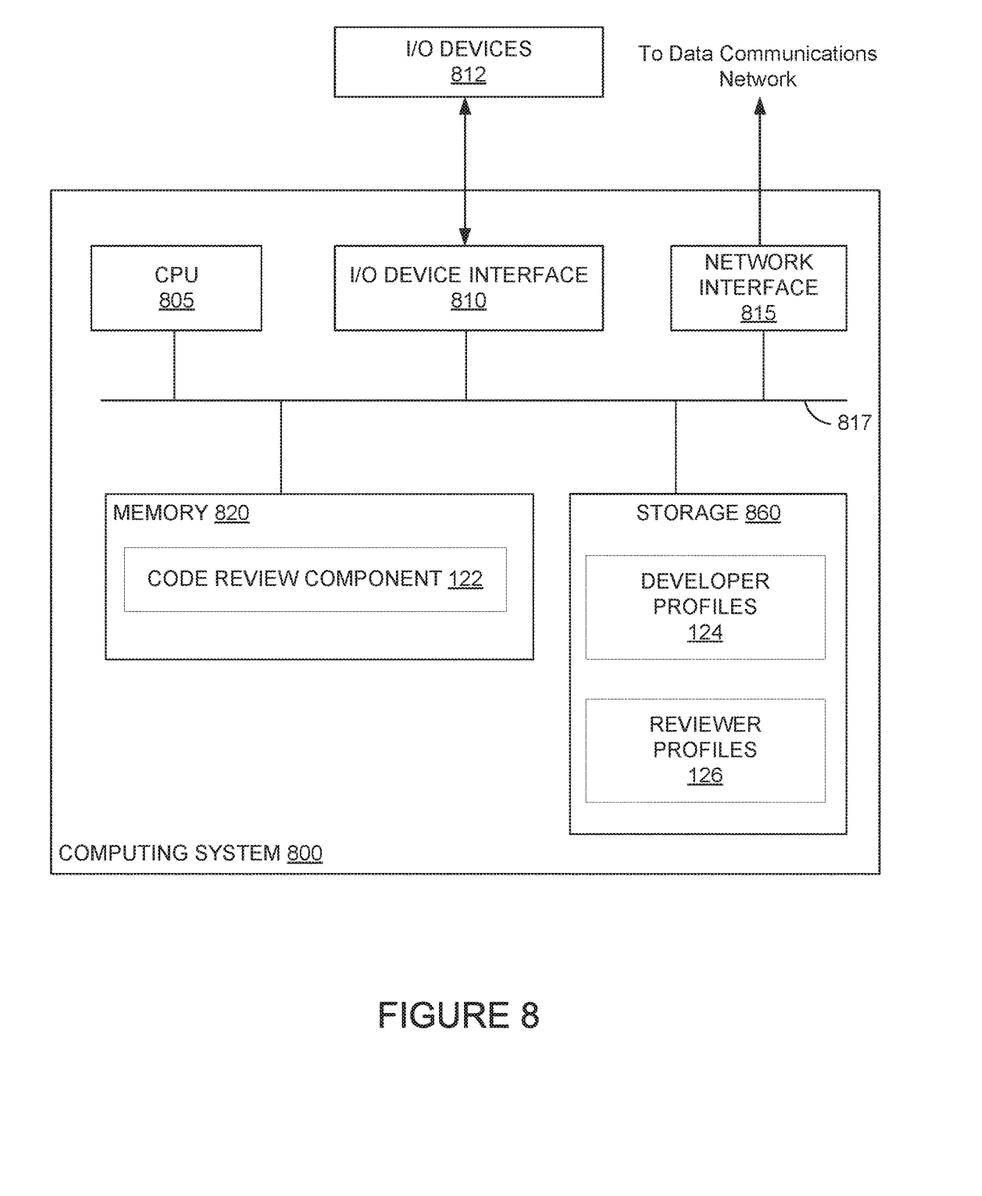
FIG. 8 is a block diagram illustrating a computing system configured to select users to review source code based on separate developer and reviewer profiles, according to one embodiment.

FIG. 8 illustrates a computing system 800 configured to select users to review code based on separate developer and reviewer profiles, according to one embodiment. As shown, the computing system 800 includes, without limitation, a central processing unit (CPU) 805, a network interface 815, a memory 820, and storage 860, each connected to a bus 817. The computing system 800 may also include an I/O device interface 810 connecting I/O devices 812 (e.g., keyboard, mouse, and display devices) to the computing system 800. Further, in context of this disclosure, the computing elements shown in the computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the memory 820. The interconnect 817 is used to transmit programming instructions and application data between CPU 805, I/O devices interface 810, storage 860, network interface 815, and memory 820. Note CPU 805 is included to be representative of a single CPU, multiple CPUs, a single CPU having multiple processing cores, and the like. Memory 820 is generally included to be representative of a random access memory. The storage 860 may be a disk drive storage device. Although shown as a single unit, storage 860 may be a combination of fixed and/or removable storage devices, such as fixed disc drives, removable memory cards, or optical storage, network attached storage (NAS), or a storage area-network (SAN). The storage 860 includes developer profiles 124 and reviewer profiles 126, both of which are described in more detail above. Illustratively, the memory 820 includes a code review component 122, which is described in more detail above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., code review component 122, etc.) or related data available in the cloud. For example, the code review component 122 could execute on a computing system in the cloud, and assign code received from a user to one or more peer users to review based on a developer profile for the user and reviewer profiles for each of the peer users. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for enhancing code review throughput based on separate profiles, comprising:

generating a first type of profile for a first user based on a collection of first source associated with the first user, wherein the first type of profile indicates different types of errors that occurred in the collection of first source code greater than at least one of a first predefined threshold number of times and a first predefined percentage of time;

determining, based on the first type of profile for the first user, that the different types of errors have a likelihood of occurring in source code written by the first user, when the first type of profile indicates that frequency of occurrence of the different types of errors is greater than at least one of the first predefined threshold number of times and the first predefined percentage of time;

receiving second source code associated with the first user;

determining, for each of one or more second users, one or more coding review attributes associated with the second user from a second type of profile for the second user;

determining a set of metrics for each of the second users, based on a collection of third source code associated with different users, wherein the set of metrics comprises at least one of: (i) a number of the different types of errors identified for every predetermined number of lines of the third source code and (ii) a code review throughput of the third source code;

generating, based on the one or more metrics, a proficiency score associated with each coding review attribute of each of the second users;

evaluating the one or more coding review attributes based on the proficiency score assigned to each coding review attribute, wherein the proficiency score for each coding review attribute indicates a number of times the second user identified at least one of the different types of errors indicated in the first type of profile greater than at least one of a second predefined number of times and a second predefined percentage of time when reviewing source code;

selecting at least one of the second users to review the first user's second source code based at least in part on the evaluation;

sending the second source code to the selected at least one second user to review; and after sending the second source code, highlighting different portions of the second source code on an interface of the selected at least one second user based on the first type of profile for the first user to increase efficiency of code review by the selected at least one second user, wherein the different portions of the second source code are associated with the different types of errors that have the likelihood of occurring in source code written by the first user.

2. The computer-implemented method of claim 1, further comprising:

receiving code review criteria associated with the first user, wherein the code review criteria comprises a minimum set of verification requirements to be satisfied by a review of the second source code, wherein the verification requirements include verification of at least one of algorithms, memory utilization, concurrency and efficiency.

3. The computer-implemented method of claim 2, further comprising:
identifying at least one coding review attribute associated with the received code review criteria; and
identifying one or more second users with a proficiency score that exceeds a threshold for the identified at least one coding review attribute, wherein the at least one second user selected to review the first user's second source code is selected from the identified one or more second users.

4. The computer-implemented method of claim 1, further comprising:
receiving a code review report from the selected at least one second user; and
updating at least one of the first type of profile for the first user and the second type of profile for selected at least one second user based in part on the code review report.

5. The computer-implemented method of claim 1, wherein the first type of profile is a developer profile and wherein the second type of profile is a reviewer profile.

6. The computer-implemented method of claim 5, wherein the first type of profile is independent from the second type of profile.

7. A system,
comprising: a processor; and
a memory storing one or more instructions which, when executed by the processor, perform an operation for enhancing code review throughput based on separate profiles, comprising:
generating a first type of profile for a first user based on a collection of first source associated with the first user, wherein the first type of profile indicates different types of errors that occurred in the collection of first source code greater than at least one of a first predefined threshold number of times and a first predefined percentage of time;
determining, based on the first type of profile for the first user, that the different types of errors have a likelihood of occurring in source code written by the first user, when the first type of profile indicates that frequency of occurrence of the different types of errors is greater than at least one of the first predefined threshold number of times and the first predefined percentage of time;
receiving second source code associated with the first user;
determining, for each of one or more second users, one or more coding review attributes associated with the second user from a second type of profile for the second user;
determining a set of metrics for each of the second users, based on a collection of third source code associated with different users, wherein the set of metrics comprises at least one of: (i) a number of the different types of errors identified for every predetermined number of lines of the third source code and (ii) a code review throughput of the third source code;
generating, based on the one or more metrics, a proficiency score associated with each coding review attribute of each of the second users;
evaluating the one or more coding review attributes based on the proficiency score assigned to each coding review attribute, wherein the proficiency score for each coding review attribute indicates a number of times the second user identified at least one of the different types of errors in the first type of profile greater than at least one of a second predefined number of times and a predefined percentage of time when reviewing source code;
selecting at least one of the second users to review the first user's second source code based at least in part on the evaluation;
sending the second source code to the selected at least one second user to review; and
after sending the second source code, highlighting different portions of the second source code on an interface of the selected at least one second user based on the first type of profile for the first user to increase efficiency of code review by the selected at least one second user, wherein the different portions of the second source code are associated with the different types of errors that have the likelihood of occurring in source code written by the first user.

8. The system of claim 7, the operation further comprising:
receiving code review criteria associated with the first user, wherein the code review criteria comprises a minimum set of verification requirements to be satisfied by a review of the second source code, wherein the verification requirements include verification of at least one of algorithms, memory utilization, concurrency and efficiency.

9. The system of claim 8, the operation further comprising:
identifying at least one coding review attribute associated with the received code review criteria; and
identifying one or more second users with a proficiency score that exceeds a threshold for the identified at least one coding review attribute, wherein the at least one second user selected to review the first user's second source code is selected from the identified one or more second users.

10. The system of claim 7, the operation further comprising:
receiving a code review report from the selected at least one second user; and
updating at least one of the first type of profile for the first user and the second type of profile for selected at least one second user based in part on the code review report.

11. The system of claim 7, wherein the first type of profile is a developer profile and wherein the second type of profile is a reviewer profile.

12. The system of claim 11, wherein the first type of profile is independent from the second type of profile.

13. A computer program product, comprising:
a computer-readable storage medium having computer-readable program code embodied therewith, the computer-readable program code executable by one or more computer processors to perform an operation for enhancing code review throughput based on separate profiles, comprising:
generating a first type of profile for a first user based on a collection of first source associated with the first user, wherein the first type of profile indicates different types of errors that occurred in the collection of first source code greater than at least one of a first predefined threshold number of times and a first predefined percentage of time;
determining, based on the first type of profile for the first user, that the different types of errors have a likelihood of occurring in source code written by the first user, when the first type of profile indicates that frequency of occurrence of the different types of errors is greater than at least one of the first predefined threshold number of times and the first predefined percentage of time;

receiving second source code associated with the first user;

determining, for each of one or more second users, one or more coding review attributes associated with the second user from a second type of profile for the second user;

determining a set of metrics for each of the second users, based on a collection of third source code associated with different users, wherein the set of metrics comprises at least one of: (i) a number of the different types of errors identified for every predetermined number of lines of the third source code and (ii) a code review throughput of the third source code;

generating, based on the one or more metrics, a proficiency score associated with each coding review attribute of each of the second users;

evaluating the one or more coding review attributes based on the proficiency score assigned to each coding review attribute, wherein the proficiency score for each coding review attribute indicates a number of times the second user identified at least one of the different types of errors indicated in the first type of profile greater than at least one of a second predefined number of times and a second predefined percentage of time when reviewing source code;

selecting at least one of the second users to review the first user's second source code based at least in part on the evaluation;

sending the second source code to the selected at least one second user to review; and after sending the second source code, highlighting different portions of the second source code on an interface of the selected at least one second user based on the first type of profile for the first user to increase efficiency of code review by the selected at least one second user, wherein the different portions of the second source code are associated with the different types of errors that have the likelihood of occurring in source code written by the first user.

14. The computer program product of claim 13, the operation further comprising:

receiving code review criteria associated with the first user, wherein the code review criteria comprises a minimum set of verification requirements to be satisfied by a review of the second source code, wherein the verification requirements include verification of at least one of algorithms, memory utilization, concurrency and efficiency.

15. The computer program product of claim 14, the operation further comprising:

identifying at least one coding review attribute associated with the received code review criteria; and identifying one or more second users with a proficiency score that exceeds a threshold for the identified at least one coding review attribute, wherein the at least one second user selected to review the first user's second source code is selected from the identified one or more second users.

16. The computer program product of claim 13, the operation further comprising:

receiving a code review report from the selected at least one second user; and updating at least one of the first type of profile for the first user and the second type of profile for selected at least one second user based in part on the code review report.

17. The computer program product of claim 13, wherein the first type of profile is independent from the second type of profile.

* * * * *